United States Patent [19]

Smith

[11] 3,868,370

[45] Feb. 25, 1975

[54] PROCESS FOR MAKING 4-BUTYROLACTONE

[75] Inventor: William E. Smith, Schenectady, N.Y.

[73] Assignee: General Electric Company, Schenectady, N.Y.

[22] Filed: Feb. 9, 1973

[21] Appl. No.: 331,195

[52] U.S. Cl. .............................................. 260/343.6
[51] Int. Cl. .............................................. C07d 5/06
[58] Field of Search ................................. 260/343.6

[56] References Cited
OTHER PUBLICATIONS

Wagner et al. Synthetic Organic Chemistry, John Wiley & Sons, New York, 1953, pages 169, 533 and 419.

Primary Examiner—Donald G. Daus
Assistant Examiner—Anne Marie T. Tighe
Attorney, Agent, or Firm—Joseph T. Cohen; Jerome C. Squillaro

[57] ABSTRACT

4-Butyrolactone can be made from 4-acetoxybutanoic acid by subjecting the latter to the action of a cyclization catalyst such as an acidic catalyst.

5 Claims, No Drawings

PROCESS FOR MAKING 4-BUTYROLACTONE

This invention is concerned with a process for making 4-butyrolactone.

More particularly, the invention is concerned with a process for making 4-butyrolactone which comprises heating 4-acetoxybutanoic acid in the presence of an acidic cyclization catalyst.

4-Butyrolactone (also known as γ-butyrolactone) having the formula

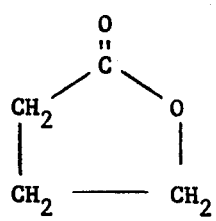

is a chemical compound which has wide utility as a solvent for various reactions, as a solvent for high polymers, and as a chemical and synthetic intermediate used to make a nylon polymer which, as is well known, has utility in the apparel art and in the insulation art. In 1969, some 60 million pounds of the lactone was manufactured and used commercially.

I have now discovered a relatively simple method for making the lactone from 4-acetoxybutanoic acid by subjecting the latter to a heat treatment in the presence of an acidic cyclizing agent capable of causing the ring closure and evolution of acetic acid whereby the desired lactone is formed. I have also found that I can start with 4-acetoxybutyraldehyde or mixtures of acetoxybutyraldehydes containing the 4-acetoxy derivative, and by a continuous process of oxidizing the butyraldehyde to the 4-acetoxybutanoic acid and then applying the cyclization reaction, to form the 4-butyrolactone. Despite the fact that there may be other acetoxybutyraldehydes mixed in with the 4-acetoxybutyraldehyde such as, for instance, the 3-acetoxyisobutyraldehyde and 2-acetoxybutyraldehyde, only the 4-acetoxybutyraldehyde converts to the 4-butyrolactone, while the other isomeric butanoic acids do not form a lactone. Thus, this constitutes a means for separating the 4-acetoxybutyraldehyde as the derivative lactone from a mixture of this aldehyde with other acetoxybutyraldehydes.

The means for making the butyrolactone by my process is relatively inexpensive and simple and merely requires heating the 4-acetoxybutanoic acid with a small amount of an acidic cyclization catalyst. The product thus obtained can be fractionally distilled and otherwise treated in manners well known in the art to isolate the 4-butyrolactone.

Among the acidic cyclization catalysts which can be employed in the practice of the present invention may be mentioned, particularly, mineral acids such as phosphoric acid, polyphosphoric acid, phosphorous pentoxide, sulfuric acid (preferably concentrated sulfuric acid), nitric acid (preferably concentrated or fuming nitric acid), hydrogen chloride; as well as other acidic cyclization agents of an organic nature such as toluene sulfonic acid, methane sulfonic acid, trichloroacetic acid, etc. Finely divided alumina can also be used for the purpose. Generally, the simple mineral acids, such as phosphoric acid, sulfuric acid, and nitric acid, are adequate for the purpose.

The amount of acidic cyclization catalyst (or mixtures thereof) used can vary widely but generally only that amount is necessary which is effective for cyclizing the acetoxybutanoic acid to cause evolution of the acetic acid which is readily evolved. I have found that the amount of acidic cyclization catalyst required to cause the reaction to go can vary widely depending on the acidic catalyst used, the temperature, etc. Experience has shown that in most instances the amount of acidic catalyst used should be from about 0.1 to about 10 to 20 percent, by weight, based on the weight of the acetoxybutanoic acid. Obviously, larger amounts of the acidic cyclization catalyst can be employed, but generally this is unnecessary.

The temperature at which the reaction proceeds can be varied widely. Under some conditions depending on the cyclization catalyst, room temperatures from about 20° to 30°C are often adequate for the purpose. In some instances, with other types of cyclization catalysts, more elevated temperatures, for instance, about 45° to 250°C are generally desirable. For most instances, the reaction mixture comprising the acetoxybutanoic acid and the cyclization catalyst are heated with stirring for a period of time on the order of about 10 to 30 minutes or more, and thereafter distilling the reaction product to effect isolation of the desired 4-butyrolactone. Well known techniques of concentration of the distillation fraction can be used to obtain the maximum yield of the 4-butyrolactone.

Although atmospheric pressures are the only ones normally required, it will of course be apparent to those skilled in the art that superatmospheric pressure or subatmospheric pressure may be used where conditions and concentrations so dictate.

In order that those skilled in the art may better understand how the present invention may be practiced, the following examples are given by way of illustration and not by way of limitation.

EXAMPLE 1

About 40 grams of mixed aldehydes (obtained by subjecting allyl acetate to hydroformylation) containing 31.0 grams of 4-acetoxybutyraldehyde (the remainder being 3-acetoxyisobutyraldehyde and 2-acetoxybutyraldehyde in a 7 to 4 weight ratio) was heated gradually to 230°C while oxygen was bubbled in. When analysis indicated that the aldehydes were completely converted to the corresponding butanoic acids, particularly the conversion of the 4-acetoxybutyraldehyde to the 4-acetoxybutanoic acid of the formula

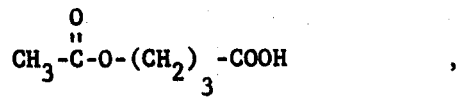

the mixture was cooled to around room temperature, and then mixed with 0.4 gram of concentrated (85 percent) phosphoric acid. On reheating the mixture to 220°–240°C for about 10 minutes, 23.8 grams of a distillate was collected boiling at 180°–220°C. Analysis of this distillate showed it to contain 13 grams of 4-butyrolactone (63 percent yield based on the 4-acetoxybutyraldehyde starting material) together with 10.8 grams of acetic acid.

EXAMPLE 2

To a three-necked flask fitted with gas inlet thermometer and condenser was charged 15 grams of the mixed aldehydes (used in Example 1), and 10 grams of pellets of 0.5 percent palladium on alumina. The mixture was stirred at about 125°C for about 1 hour while oxygen was continuously bubbled in. The mixture was then heated to 183°C for 15 minutes at which time it was established that the principal ingredient obtained was the 4-acetoxybutanoic acid. On further heating to 199°C for about 40 minutes, and then additional heating at 200°C for about 90 minutes, the reaction mixture was distilled to give about 2.5 grams acetic acid and about 4 grams of 4-butyrolactone, which represented about a 50 percent yield, based on the weight of the 4-acetoxybutyraldehyde.

EXAMPLE 3

A mixture of 20 grams of the mixed aldehydes described in Example 1 was treated with 15 ml fuming $HNO_3$ (120 percent) added over a period of 10 minutes. The mixture was then stirred for an hour at room temperature and then combined with 50 ml water. Aqueous sodium hydroxide was added to the mixture in an amount sufficient to neutralize the latter. The aqueous phase of reaction product was then extracted successively with portions of heptane, chloroform, and diethyl ether. On combining the organic phases and distillation, a mixture of acetic acid and 3 grams of 4-butyrolactone was obtained corresponding to a yield of about 26 percent, based on the weight of the 4-acetoxybutyraldehyde.

It will of course be apparent to those skilled in the art that in addition to the cyclization catalysts used in the foregoing examples, other cyclization catalysts may be employed, many examples of which have been given before, without departing from the scope of the invention. Additionally, it should be amply clear that instead of starting with the 4-acetoxybutyraldehyde, one can start with the 4-acetoxybutanoic acid directly. However, since the 4-acetoxybutyraldehyde, combined with the other isomeric aldehydes, is commercially available from other sources, it is just as easy and often more economical to start with a mixture of acetoxybutyraldehydes in which the 4-acetoxybutyraldehyde of course predominates. By selective oxidation of the aldehyde to the corresponding 4-acetoxybutanoic acid and thereafter cyclization to the 4-butyrolactone, an inexpensive simple process for making the lactone is available for commercial use.

What I claim as new and desire to secure by Letters Patent of the United States is:

1. The process for making 4-butyrolactone which comprises the step of heating 4-acetoxybutanoic acid in the presence of an acidic cyclization catalyst selected from the class consisting of nitric acid, phosphoric acid, sulfuric acid, polyphosphoric acid, phosphorous pentoxide, hydrogen chloride, toluene sulfonic acid, methane sulfonic acid, trichloroacetic acid, and finely divided alumina.

2. The process for making 4-butyrolactone which comprises the steps of oxidizing 4-acetoxybutyraldehyde to the corresponding 4-acetoxybutanoic acid and thereafter treating the latter with an acidic cyclization catalyst selected from the class consisting of nitric acid, phosphoric acid, sulfuric acid, polyphosphoric acid, phosphorous pentoxide, hydrogen chloride, toluene sulfonic acid, methane sulfonic acid, trichloroacetic acid, and finely divided alumina.

3. the process as in claim 2 wherein the 4-acetoxybutyraldehyde is in the form of a mixture with other isomeric acetoxybutyraldehydes.

4. The process as in claim 1 wherein the acidic cyclization catalyst is concentrated phosphoric acid.

5. The process for making 4-butyrolactone which comprises the steps of simultaneously passing 4acetoxybutyraldehyde and oxygen over a heated acidic cyclization catalyst selected from the class consisting of nitric acid, phosphoric acid, sulfuric acid, polyphosphoric acid, phosphorous pentoxide, hydrogen chloride, toluene sulfonic acid, methane sulfonic acid, trichloroacetic acid, and finely divided alumina, at elevated temperatures ranging up to 250°C, and thereafter removing the formed 4-butyrolactone.

* * * * *